(12) United States Patent
Lin

(10) Patent No.: US 8,157,390 B2
(45) Date of Patent: Apr. 17, 2012

(54) PROJECTING SYSTEM AND LENS COMBINATION THEREOF

(75) Inventor: Ming-Kuen Lin, Yunlin County (TW)

(73) Assignee: Qisda Corporation, Taoyuan County (TW)

( * ) Notice: Subject to any disclaimer, the term of this patent is extended or adjusted under 35 U.S.C. 154(b) by 443 days.

(21) Appl. No.: 12/401,872

(22) Filed: Mar. 11, 2009

(65) Prior Publication Data
US 2009/0231556 A1 Sep. 17, 2009

(30) Foreign Application Priority Data
Mar. 11, 2008 (TW) .............................. 97108460 A

(51) Int. Cl.
*G03B 21/20* (2006.01)
*G03B 21/28* (2006.01)
*G02B 15/14* (2006.01)
*G02B 9/00* (2006.01)
*G02B 5/04* (2006.01)
*G02B 7/28* (2006.01)
*G02B 6/00* (2006.01)
*H04N 5/74* (2006.01)

(52) U.S. Cl. .............. 353/102; 353/81; 353/98; 353/33; 359/691; 359/754; 359/837; 348/771; 396/113; 362/551

(58) Field of Classification Search .................. 353/102, 353/81, 98, 33; 359/691, 678, 689, 754, 359/837; 396/113; 348/771; 362/551
See application file for complete search history.

(56) References Cited

U.S. PATENT DOCUMENTS

| | | | |
|---|---|---|---|
| 5,982,538 A * | 11/1999 | Shikama et al. ............... 359/465 |
| 2005/0073654 A1 * | 4/2005 | Jeon ................................ 353/31 |
| 2005/0168797 A1 * | 8/2005 | Jeon ................................ 359/291 |
| 2006/0007402 A1 * | 1/2006 | Jeon ................................ 353/31 |

* cited by examiner

*Primary Examiner* — Georgia Y Epps
*Assistant Examiner* — Magda Cruz

(57) ABSTRACT

The invention discloses a projecting system. The projecting system includes two sets of lens. The first set of lens has a first focal length for focusing an incident ray of light to form a first image. The second set of lens has a second focal length for projecting the first image to form a second image. The two sets of lens are separated by a lens-apex distance relative to the light path between the two sets of lens. The second focal length is smaller than or equal to the lens-apex distance. A difference between the second focal length and the lens-apex distance is smaller than or equal to a half of the first focal length.

17 Claims, 3 Drawing Sheets

PROJECTING SYSTEM AND LENS COMBINATION THEREOF

BACKGROUND OF THE INVENTION

1. Field of the Invention

The present invention relates to a projecting system, and more particularly, relates to a projecting system with several sets of lenses.

2. Description of the Prior Art

Recently, multimedia systems are more and more popular with the development of electronic products. A display device for showing images is a significant hardware in most multimedia systems. Raising quality of the display device as well as the appearance design of it are taken seriously. Take a projecting system used in public places or in a family theater for example, users always ask for a projecting device which is light, occupies small space volume (comes in small volume), and is able to provide bright and clear images.

In the prior art relative to a projecting system, development personnel focused on optimizing devices of the projecting system (for example, a light source, a color wheel, a camera lens, a heat-dissipation apparatus, a control circuit, and so on). How devices of a projecting system should be arranged effectively can not be ignored with the request of lightening a projecting system with the consideration of quality images.

SUMMARY OF THE INVENTION

The present invention is to provide a projecting system. Optical imaging, energy imaging, and an arrangement of the projecting system could be optimized simultaneously through arranging lenses of the projection system. In other words, the projecting system has the advantages of showing images clearly, using energy effectively, and flexibility of space arrangement.

A projecting system according to an embodiment of the invention includes two sets of lens. The first set of lens has a first focal length for focusing an incident ray of light to form a first image. The second set of lens has a second focal length for projecting the first image to form a second image. The two sets of lens are separated by a lens-apex distance which is relative to a light path between the first set of lens and the second set of lens. The second focal length is smaller than or equal to the lens-apex distance. A difference between the second focal length and the lens-apex distance is smaller than or equal to a half of the first focal length.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
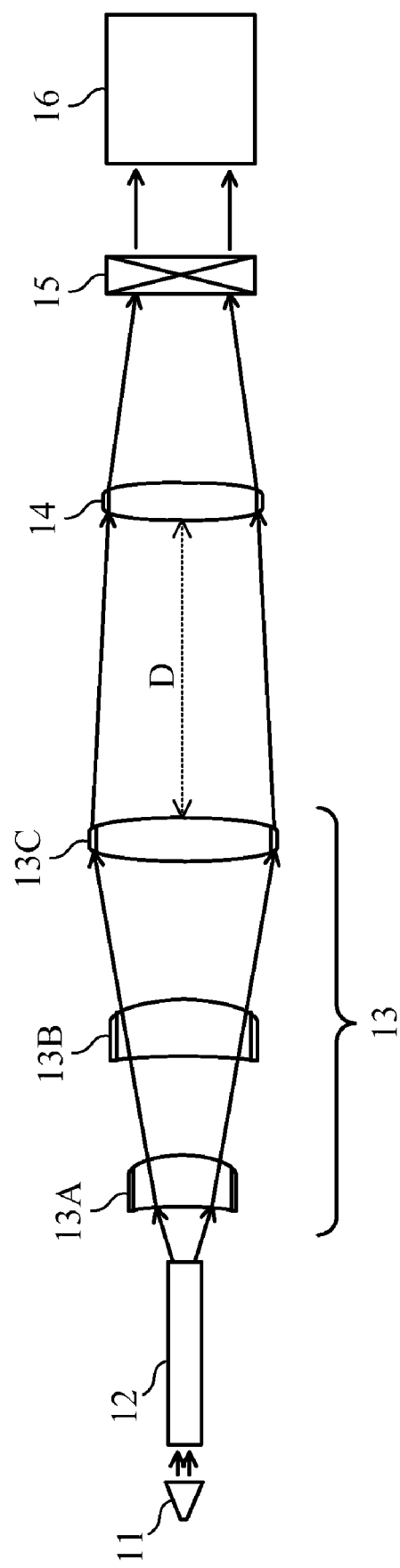
FIG. 1 illustrates an inner arrangement of a projecting system according to the first embodiment of the invention.

A projecting system according to the first embodiment of the invention includes two sets of lens. Please refer to FIG. 1. FIG. 1 illustrates a schematic diagram of the projecting system. As shown in FIG. 1, the projecting system 10 includes a light source 11, a light pipe 12, a first set of lens 13, a second set of lens 14, a light valve 15, and a camera lens 16.

In this embodiment, the second set of lens 14 is a refractive lens and the first set of lens 13 includes three refractive lenses 13A, 13B, and 13 C. In application, the first set of lens 13 could include only two refractive lenses. Aberration of the first set of lens 13 could be changed by using different numbers of refractive lenses.

In practical application, the light source 11 could be a mercury bulb, a tungsten bulb or other light emitters with shape of ellipsoid, for providing an original ray of light. The original ray of light is to be reflected by the light pipe 12 several times. Extensions of each reflected ray of light will be equivalent to form a light source array including several light sources 11. In other words, a combination of the light source 11 and the light pipe 12 is equivalent to a surface light source at the outlet of the light pipe 12.

The first set of lens 13 has a first equivalent focal length F1 and a first equivalent principal plane for focusing an incident ray of light to form a first image (the first imaging). The second set of lens 14 has a second equivalent focal length F2 and a second equivalent principal plane for projecting the first image to form a second image (the second imaging).

In application, the light valve 15 is a digital micro-mirror device for receiving the light emitted from the second set of lens 14 and determining the amount of light quality to be reflected or guided to the camera lens 16. Afterwards, the camera lens 16 will project the light from the light valve 15 to outside of the projecting system 10, so as to form a corresponding target image.

In this embodiment, the surface light source at the outlet of the light pipe 12 is disposed within the focal length F1 from the left side of the first equivalent principal plane. Therefore, the first imaging of the surface light source is a virtual image imaged on the left side of the first equivalent principal plane. In fact, the virtual image is imaged by more than double of the second equivalent focal length F2 from the left side of the second equivalent principal plane. Therefore, the virtual image is a real image for the second set of lens 14 and it will be imaged again (the second imaging) by one to two times of the second equivalent focal length F2 from the right side of the second equivalent principal plane. The light valve 15 is disposed at the place where the image is imaged. Thus it can be seen that the above-mentioned surface light source is transmitted through the first set of lens 13 and the second set of lens 14 to be projected to the light valve 15.

On the other hand, the light source 11 at the inlet of the light pipe 12 is disposed by more than double of the first equivalent focal length F1 from the left side of the first equivalent principal plane. Therefore, the first imaging of the light source 11 is an image imaged by one to two of the first equivalent focal length F1 from the right side of the first equivalent principal plane. For the second set of lens 14, the image is imaged by one to two times of the second equivalent focal length F2 from the left side of the second equivalent principal plane. Therefore, the image will be imaged again (the second imaging) by double of the second equivalent focal length F2 from the right side of the second equivalent principal plane. The entrance pupil of the camera lens 16 is disposed at the place where the second image is imaged. In other word, the light emitted by the light source 11 is transmitted through the first set of lens 13 and the second set of lens 14 to be projected to the entrance pupil of the camera lens 16.

To sum up, the projecting system 10 shows two kinds of imaging mechanisms. One is optical imaging that the surface light source at the outlet of the light pipe 12 is imaged in the light valve 15. The other is energy imaging that the light source 11 at the inlet of the light pipe 12 is imaged in the entrance pupil of the camera lens 16.

The surface light source at the outlet of the light pipe 12 is projected to the light valve 15 uniformly and accurately with proper magnifying power of the first set of lens 13 and the second set of lens 14. For the projecting system 10, the optical imaging is optimized thereby. On the other hand, the energy imaging is optimized by projecting the energy provided from the light source 11 to the camera lens 16 completely.

According to this invention, the second equivalent focal length F2 of the projecting system 10 is designed to be smaller than or equal to a lens-apex distance D and a difference between the lens-apes distance D and the second equivalent focal length F2 is smaller than or equal to a half of the first equivalent focal length F1. The lens-apex distance D is related to a light path between the first set of lens 13 and the second set of lens 14. Obviously, the distance is along the direction of light path from an apex of the right side of the refractive lens 13C to an apex of the left side of the refractive lens 14. Experiments have proved that optical imaging and energy imaging are optimized simultaneously with the magnitude of the above-mentioned focal lengths and the arrangement of the lens combination.

Figure 2:
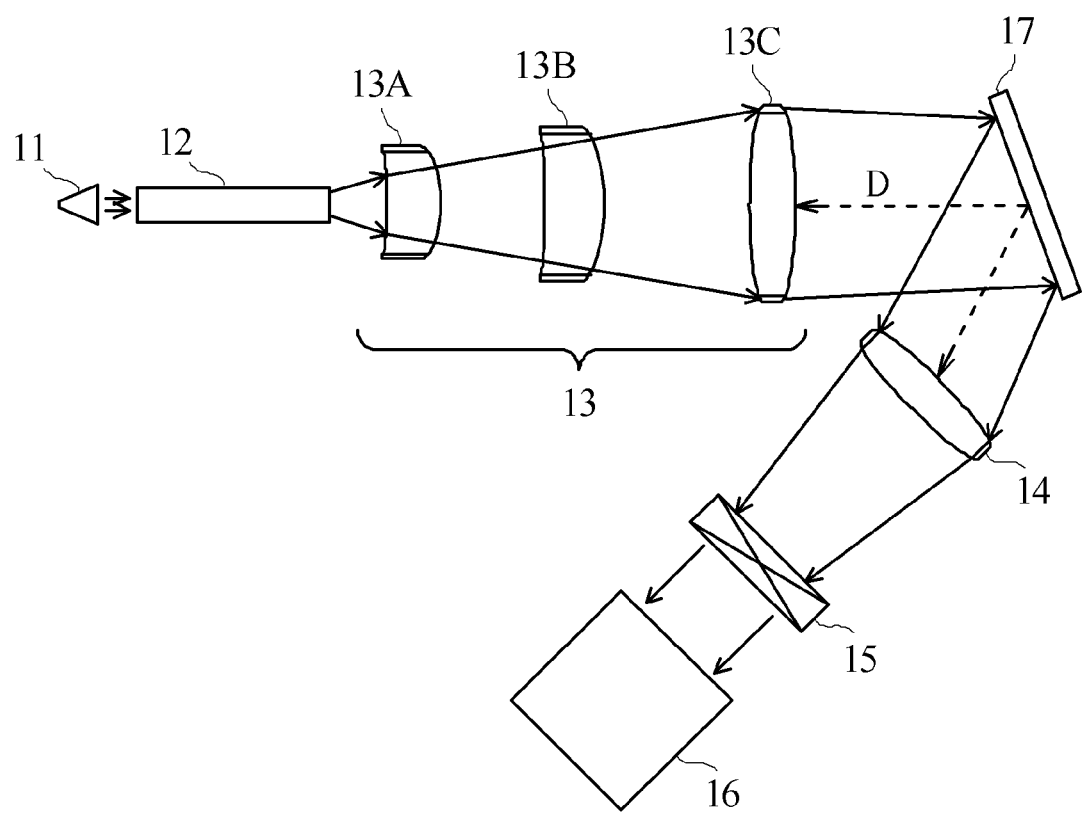
FIG. 2 illustrates an inner arrangement of a projecting system according to the second embodiment of the invention.

Please refer to FIG. 2. According to the second embodiment of the invention, the projecting system 10 further includes a reflector 17. As shown in FIG. 2, the reflector 17 is disposed between the first set of lens 13 and the second set of lens 14 for reflecting light emitted from the first set of lens 13 to the second set of lens 14. Thus, the distance of the light path between the first set of lens 13 and the second set of lens 14 is not changed (the lens-apex distance still equals to D), but the arrangement of the second set of lens 14 is more flexible. With a proper position of the reflector 17, the optical imaging and the energy imaging are optimized simultaneously and the arrangement of the projecting system 10 is optimized, too.

Figure 3:
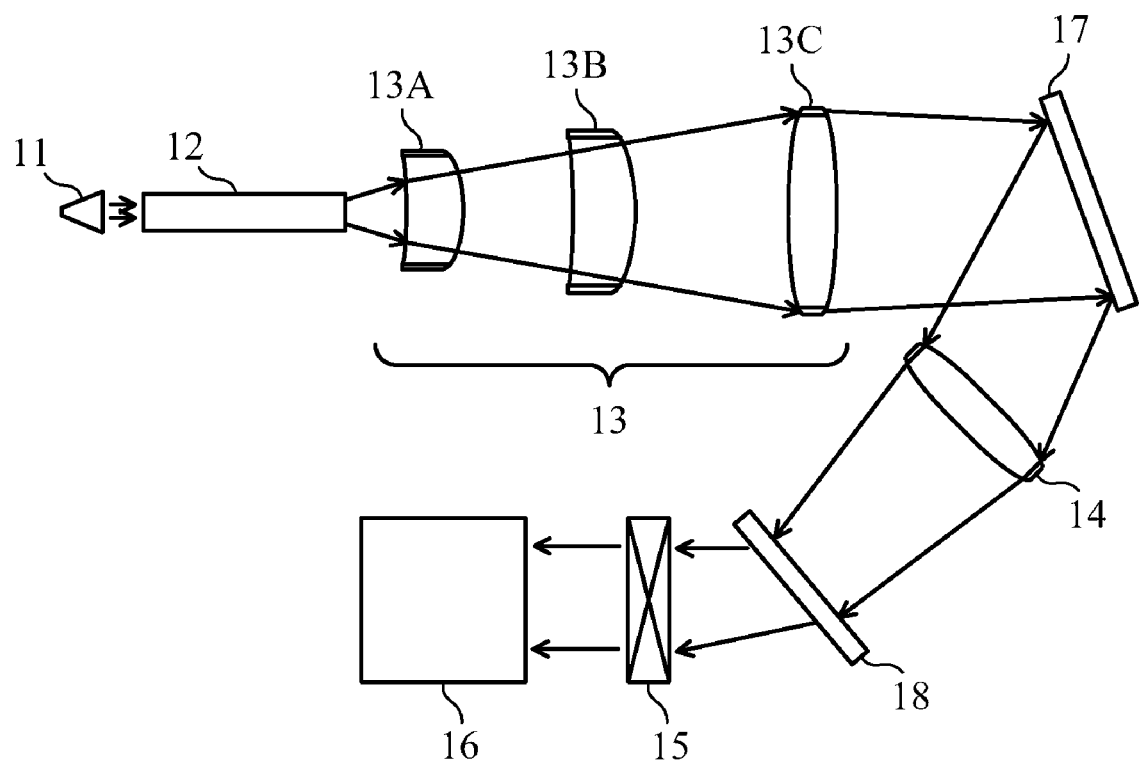
FIG. 3 illustrates an inner arrangement of a projecting system according to the third embodiment of the invention.

Please refer to FIG. 3. According to the third embodiment of the invention, the projecting system 10 further includes a prism 18 for refracting the light emitted from the second set of lens 14 to the light valve 15. By doing so, the arrangement relation of the second set of lens 14 and the light valve 15 are more flexible, so as to use the space of the projecting system 10 effectively. In practical application, the prism could be a total internal reflection prism.

The fourth embodiment according to the invention represents a combination of the first set of lens 13 and the second set of lens 14. Except for the projecting system, the lens combination and the arrangement thereof could also be applied in other optical imaging systems. As mentioned above, the optical imaging, the energy imaging and the arrangement of machinery could be optimized simultaneously by the projecting system or the lens combination according to the invention. In other words, the projecting system and the lens combination according to the invention have the advantages of showing images clearly, using energy effectively and flexibility in space arrangement.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A projecting system, comprising:
 a lens combination, comprising:
  a first set of lens with a first equivalent focal length, for focusing an incident ray of light to form a first image; and
  a second set of lens with a second equivalent focal length, for projecting the first image to form a second image, the first set of lens and the second set of lens being separated by a lens-apex distance, the second equivalent focal length being smaller than or equal to the lens-apex distance, a difference between the second equivalent focal length and the lens-apex distance being smaller than or equal to a half of the first equivalent focal length, wherein the lens-apex distance is relative to a light path between the first set of lens and the second set of lens.

2. The projecting system of claim 1, wherein the first set of lens has an equivalent principal plane, and the projecting system further comprises:
 a light source, disposed by more than double of the first equivalent focal length from a side of the equivalent principal plane; and
 a light pipe, comprising an inlet and an outlet, the inlet being disposed near the light source, the outlet being disposed within the first equivalent focal length from a side of the equivalent principal plane.

3. The projecting system of claim 1, wherein the first set of lens comprises three refractive lenses.

4. The projecting system of claim 1, wherein the first set of lens comprises two refractive lenses.

5. The lens combination of claim 1, wherein the second set of lens comprises a refractive lens.

6. The projecting system of claim 1, wherein the second set of lens has an equivalent principal plane, and the projecting system further comprises:
 a light valve, disposed by one to two times of the second equivalent focal length from a side of the effective principal plane.

7. The projecting system of claim 6, wherein the light valve is a digital micro-mirror device.

8. The projecting system of claim 6, wherein the incident ray of light is transmitted through the first set of lens and the second set of lens to be projected to the light valve.

9. The projecting system of claim 1, wherein the second set of lens comprises an equivalent principal plane, and the projecting system further comprises:
 a camera lens, disposed by more than double of the second effective focal length from a side of the equivalent principal plane.

10. The projecting system of claim 1, further comprising:
 a reflector, disposed between the first set of lens and the second set of lens for reflecting a first ray of light emitted from the first set of lens to form a second ray of light reflected to the second set of lens.

11. The projecting system of claim 10, further comprising:
 a prism, for refracting the second ray of light to form a third ray of light;
 a light valve, for receiving the third ray of light and guiding the third ray of light to form a fourth ray of light; and
 a camera lens, for receiving the fourth ray of light and projecting a target image according to the fourth ray of light.

12. The projecting system of claim 11, wherein the light valve is a digital micro-mirror device.

13. The projecting system of claim 11, wherein the prism is a total internal reflectance prism.

14. A lens combination, comprising:
 a first set of lens, having a first equivalent focal length for focusing an incident ray of light to form a first image; and
 a second set of lens, having a second equivalent focal length for projecting the first image to form a second image, wherein the first set of lens and the second set of lens is separated by a lens-apex distance, the second equivalent focal length is smaller than or equal to the lens-apex distance, the difference between the second equivalent focal length and the lens-apex distance is smaller than or equal to a half of the first equivalent focal length, and the lens-apex distance is relative to a light path between the first set of lens and the second set of lens.

15. The lens combination of claim 14, wherein the first set of lens comprises three refractive lenses.

16. The lens combination of claim 14, wherein the first set of lens comprises two refractive lenses.

17. The lens combination of claim 14, wherein the second set of lens comprises a refractive lens.

* * * * *